(12) United States Patent
Zhou et al.

(10) Patent No.: US 9,510,267 B2
(45) Date of Patent: Nov. 29, 2016

(54) DATA SENDING METHOD, DATA FORWARDING METHOD, APPARATUS, AND SYSTEM

(71) Applicant: Huawei Technologies Co., Ltd., Shenzhen (CN)

(72) Inventors: Ziquan Zhou, Nanjing (CN); Xun Yang, Shenzhen (CN); Lvxi Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/553,490

(22) Filed: Nov. 25, 2014

(65) Prior Publication Data
US 2015/0085736 A1    Mar. 26, 2015

Related U.S. Application Data

(63) Continuation of application No. PCT/CN2013/073237, filed on Mar. 27, 2013.

(30) Foreign Application Priority Data

May 26, 2012 (CN) .......................... 2012 1 0166763

(51) Int. Cl.
| | |
|---|---|
| *H04W 4/00* | (2009.01) |
| *H04W 40/22* | (2009.01) |
| *H04W 4/06* | (2009.01) |
| *H04W 74/08* | (2009.01) |
| *H04W 40/10* | (2009.01) |
| *H04W 88/04* | (2009.01) |

(52) U.S. Cl.
CPC .............. *H04W 40/22* (2013.01); *H04W 4/06* (2013.01); *H04W 40/10* (2013.01); *H04W 74/0816* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2006/0111045 | A1 | 5/2006 | Orlassino et al. |
| 2006/0171366 | A1 | 8/2006 | Suzuki et al. |
| 2007/0274272 | A1 | 11/2007 | Joshi et al. |
| 2008/0137585 | A1 | 6/2008 | Loyola et al. |

(Continued)

FOREIGN PATENT DOCUMENTS

| | | |
|---|---|---|
| CN | 1801780 A | 7/2006 |
| CN | 101174930 A | 5/2008 |

(Continued)

OTHER PUBLICATIONS

Foreign Communication From A Counterpart Application, European Application No. 13797659.3, Extended European Search Report dated Aug. 7, 2015, 6 pages.

(Continued)

*Primary Examiner* — Anh-Vu Ly
(74) *Attorney, Agent, or Firm* — Conley Rose, P.C.

(57) ABSTRACT

A data sending method of a terminal, including sending a data frame to a relay, where the data frame includes a relay information bit, the relay information bit identifies whether the relay needs to forward the data frame, and if the relay information bit indicates that the relay needs to forward the data frame, the data frame is forwarded to an access point by the relay; and receiving a response message of the access point, where the response message is used indicates that the data frame is correctly received by the access point.

24 Claims, 4 Drawing Sheets

| Frame control | Duration | Address 1 | Address 2 | Address 3 | Sequence control | ... |
|---|---|---|---|---|---|---|

Select a bit to indicate that a relay is required

Redefine it as an indication of a Relay

(56) References Cited

U.S. PATENT DOCUMENTS

| | | | | |
|---|---|---|---|---|
| 2008/0310348 | A1* | 12/2008 | Nandagopalan | H04W 74/0816 370/328 |
| 2013/0235792 | A1* | 9/2013 | Abraham | H04W 76/02 370/315 |
| 2013/0294331 | A1* | 11/2013 | Wang | H04B 7/155 370/315 |

FOREIGN PATENT DOCUMENTS

| | | |
|---|---|---|
| CN | 101222299 A | 7/2008 |
| CN | 100542135 C | 9/2009 |
| CN | 101938795 A | 1/2011 |
| CN | 102202382 A | 9/2011 |
| EP | 1679838 A1 | 7/2006 |
| EP | 1924009 A1 | 11/2006 |
| WO | 2011063295 A1 | 5/2011 |

OTHER PUBLICATIONS

Foreign Communication From A Counterpart Application, Chinese Application No. 201210166763.4, Nov. 26, 2015, 7 pages.

Foreign Communication From A Counterpart Application, Korean Application No. 10-2014-7035793, Korean Office Action dated Dec. 23, 2015, 4 pages.

Foreign Communication From A Counterpart Application, Korean Application No. 10-2014-7035793, English Translation of Korean Office Action dated Dec. 23, 2015, 2 pages.

Foreign Communication From A Counterpart Application, PCT Application No. PCT/CN2013/073237, English Translation of International Search Report dated Jul. 11, 2013, 2 pages.

Foreign Communication From A Counterpart Application, PCT Application No. PCT/CN2013/073237, English Translation of Written Opinion dated Jul. 11, 2013, 13 pages.

"Part 11: Wireless LAN Medium Access Control (MAC) and Physical Layer (PHY) Specifications," IEEE P802.11-REVmc/D1.0, Jan. 2013, 2722 pages.

"The Role of Repeaters in IEEE 802.11ah," Extended Submission, Slide, Mar. 5, 2012, 9 pages.

"Relays for 11ah," Qualcomm Relays for 11ah, Extended Submission, Slide, Qualcomm Incorporated, Apr. 13, 2012, 11 pages.

Foreign Communication From a Counterpart Application, Chinese Application No. 201210166763.4, Chinese Office fiction dated Jul. 7, 2016, 7 pages.

* cited by examiner

DATA SENDING METHOD, DATA FORWARDING METHOD, APPARATUS, AND SYSTEM

CROSS-REFERENCE TO RELATED APPLICATIONS

This application is a continuation of International Application No. PCT/CN2013/073237, filed on Mar. 27, 2013, which claims priority to Chinese Patent Application No. 201210166763.4, filed on May 26, 2012, both of which are hereby incorporated by reference in their entireties.

TECHNICAL FIELD

Embodiments of the present invention relate to the communications field, and in particular, to a data sending method, a data forwarding method, an apparatus, and a system.

BACKGROUND

In a wireless local area network, a Basic Service Set (BSS) needs to cover a large range, and besides, some stations with limited power (battery power supply) exist; therefore, when battery performance of these stations deteriorates (insufficient power supply), data sent from these stations cannot arrive at an Access Point (AP). Therefore, a relay needs to be introduced to assist in communication of these stations.

In the prior art, a procedure in which a Relay is specified for a station that requires a relay is provided. This solution is to set a fixed Relay for a station that requires a relay, and then all data sent by the station is forwarded by the relay.

In the prior art, a process in which a station and a Relay are connected is given, while there is no process, in which the station and the Relay communicate after the connection. In addition, in a solution in which a fixed Relay is set in the prior art, when a Relay station moves, which changes a network topology structure, another Relay station needs to be specified for a Station (STA). When the network topology structure changes quickly, connection needs to be established repeatedly for the conventional solution, resulting in low efficiency.

SUMMARY

Embodiments of the present invention provide a data sending method, a data forwarding method, an apparatus, and a system, so as to solve a problem of communication between a station and a terminal that have limited power.

An embodiment of the present invention provides a data sending method for a terminal, including: sending a data frame to a relay, where the data frame includes a relay information bit, the relay information bit identifies whether the relay needs to forward the data frame, and if the relay information bit indicates that the relay needs to forward the data frame, the data frame is forwarded to an access point by the relay; and receiving a response message of the access point, where the response message is used indicates that the data frame is correctly received by the access point.

An embodiment of the present invention provides a data forwarding method of a relay, including: receiving a data frame sent by a terminal, where the data frame includes a relay information bit, and the relay information bit identifies whether the relay needs to forward the data frame; and if the relay information bit indicates that the relay needs to forward the data frame, sending the data frame to an access point.

An embodiment of the present invention provides a data sending terminal, where the terminal includes: a sending module and a receiving module; the sending module is configured to send a data frame to a relay, where the data frame includes a relay information bit, the relay information bit identifies whether the relay needs to forward the data frame, and if the relay information bit indicates that the relay needs to forward the data frame, the data frame is forwarded to an access point by the relay; and the receiving module is configured to receive a response message of the access point, where the response message is used indicates that the data frame is correctly received by the access point.

An embodiment of the present invention provides a data forwarding relay, where the relay includes: a receiving module and a sending module, where the receiving module is configured to receive a data frame sent by a terminal, where the data frame includes a relay information bit, and the relay information bit identifies whether the relay needs to forward the data frame; and the sending module is configured to: if the relay information bit indicates that the relay needs to forward the data frame, send the data frame to an access point.

Using the data sending method, the data forwarding method and the devices according to the embodiments of the present invention, an information exchange method of a terminal and an access point in a case in which the terminal has limited power is provided, so that data sent by the terminal that has limited power arrives at the access point.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
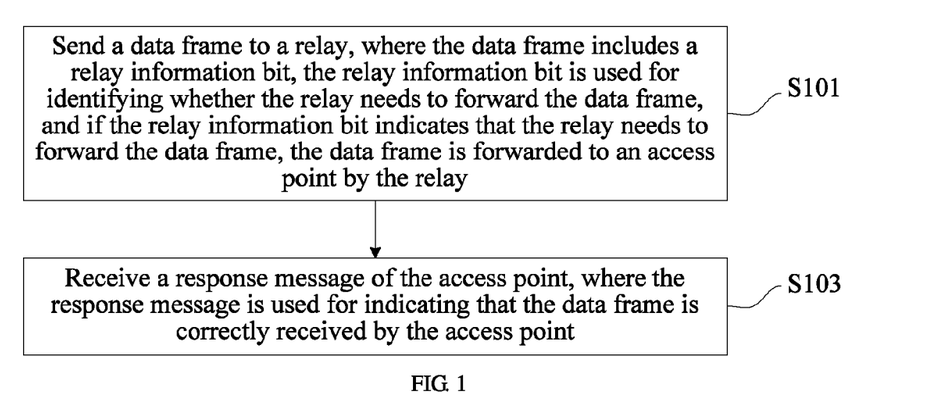
FIG. 1 is a flowchart of an embodiment of a data sending method of a terminal according to the present invention.

An embodiment of the present invention provides a data sending method of a terminal. As shown in FIG. 1, FIG. 1 provides a flowchart of an embodiment of the present invention. The method includes:

S101: Send a data frame to a relay, where the data frame includes a relay information bit, the relay information bit identifies whether the relay needs to forward the data frame, and if the relay information bit indicates that the relay needs to forward the data frame, the data frame is forwarded by the relay to an access point;

S103: Receive a response message of the access point, where the response message is used indicates that the data frame is correctly received by the access point.

A Bit that indicates that Relay is required is added into a frame control header of the data frame, and may be named a Relay bit. For example, a frame for which the Relay bit=1 indicates that the frame needs to be relayed; and a frame for which the Relay bit=0 indicates that the frame does not need to be relayed.

In an embodiment of the present invention, if the relay information bit indicates that the relay does not need to forward the data frame, the data frame is discarded by the relay.

Figure 2:
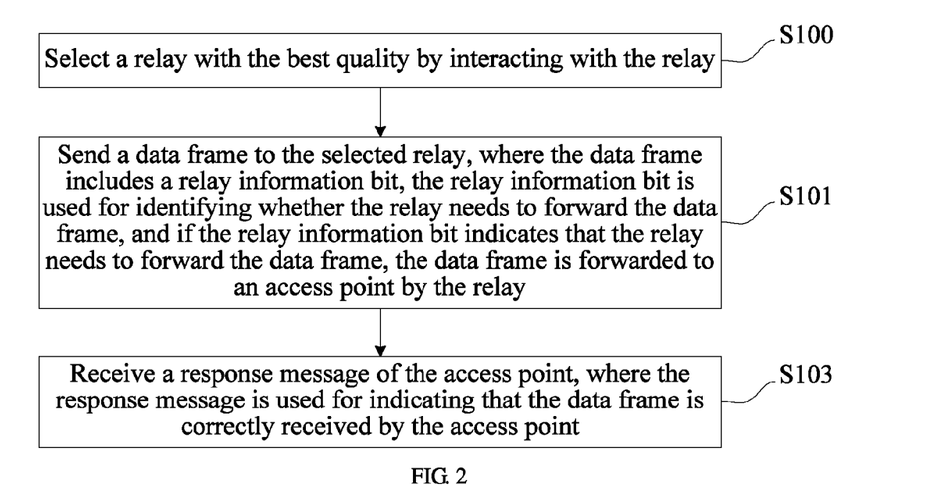
FIG. 2 is a flowchart of another embodiment of a data sending method of a terminal according to the present invention.

In an embodiment of the present invention, FIG. 2 provides a flowchart of an embodiment of the present invention. Before the S101 of sending a data frame to a relay, the method further includes:

S100: Select a relay with the best quality by interacting with the relay; the sending a data frame to a relay includes: send the data frame to the selected relay.

The data frame further includes a relay address information bit, where the relay address information bit carries address information of the selected relay;

The S101 of sending the data frame to the selected relay includes: sending a data frame that includes the relay address information bit to the selected relay, so that, if information about the relay address information bit is consistent with the address information of the selected relay, the data frame is forwarded to the access point by the selected relay.

Figure 3:
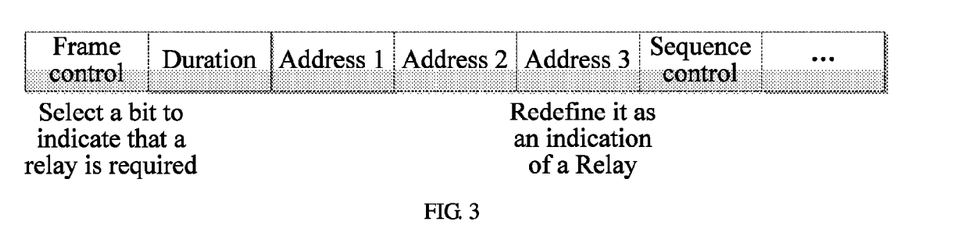
FIG. 3 provides a structure of a frame control header of a data frame according to an embodiment of the present invention.

FIG. 3 provides a structure of a frame control header of a data frame according to an embodiment of the present invention. A meaning of a field of an address 3 is redefined in a frame control header of a data frame, where the address 3 carries an identifier of a Relay station, and may be a MAC address of the Relay station. An address 1 and an address 2 respectively represent address information of a sending terminal of the data frame and address information of a target access point of the data frame.

Figure 4:
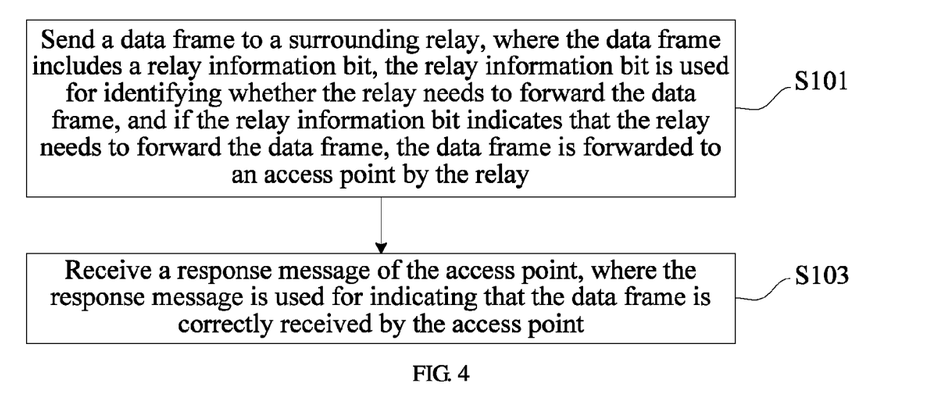
FIG. 4 is a flowchart of still another embodiment of a data sending method of a terminal according to the present invention.

When connecting to a Relay in advance, the Relay station knows which station is to be connected, and an AP is also notified of this information. Therefore, based on an address of a station that requires a Relay, the Relay station can determine whether to connect to the station in advance, and the AP can also know which Relay station forwards a frame, so that the address 3 may also not carry information about the Relay station. In this case, a bit that indicates that a Relay is required only needs to be added into a frame control field In an embodiment of the present invention, FIG. 4 provides a flowchart of an embodiment of the present invention. The S101 of sending a data frame to a relay includes: sending the data frame to the relay by broadcasting. In this embodiment, a data sending method in which a forwarding relay is not selected in advance is provided. Therefore, in this solution, when a network topology structure changes quickly, a relay does not need to be selected repeatedly, resulting in higher efficiency.

In an embodiment of the present invention, after the S101 of sending a data frame to a relay, the method further includes: if the response message of the access point is not received within a first duration, resending the data frame to the relay, where the first duration is obtained according to twice a duration of a short inter-frame space, a timeslot duration, a sending duration of the data frame, and a delay duration of receiver starting.

For a station that requires a Relay, ACKTimeout Interval=aSIFSTime*2+aSlotTime+aPPDUtime+aPHY-RX-START-Delay.

The acknowledgement timeout (ACKTimeout) Interval is used indicates the first duration, the aSIFSTime is the duration of one short inter-frame space (Short Inter-frame Space, SIFS), the aSlotTime is a length of a timeslot defined in the protocol Institute of Electrical and Electronics Engineers (IEEE) 802.11 and indicates a propagation delay, the aPPDUtime indicates the sending duration of the data frame, and the aPHY-RX-START-Delay indicates the delay duration of receiver starting. When forwarding the frame, a Relay station sets of a network allocation vector (NAV) of a surrounding station, where the NAV indicates a waiting duration of sending, after the relay sends the data frame, a data frame by another relay except the relay that sends the data frame. When a Relay bit indicates that the relay needs to forward the data frame, for the surrounding station that is not the Relay station, NAV=SIFS+ACK+SIFS+aPPDUtime is set, where the SIFS indicates the duration of one short inter-frame space (SIFS), the ACK indicates the first duration, and the aPPDUtime indicates the sending duration of the data frame.

In another embodiment of the present invention, after the sending a data frame to a relay, the method further includes: receiving the data frame forwarded by the relay; and if the data frame forwarded by the relay is incorrect, resending the data frame to the relay.

Figure 5:
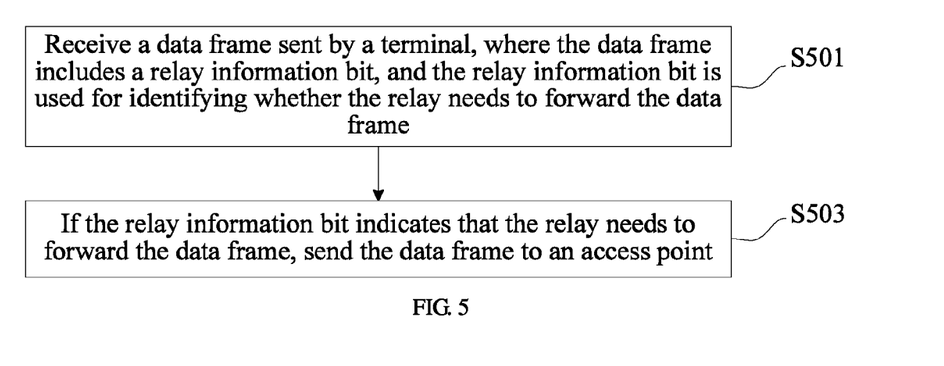
FIG. 5 is a flowchart of an embodiment of a data forwarding method of a relay according to the present invention.

An embodiment of the present invention provides a data forwarding method of a relay. FIG. 5 provides a flowchart of an embodiment of the present invention. The method includes:

S501: Receive a data frame sent by a terminal, where the data frame includes a relay information bit, and the relay information bit identifies whether the relay needs to forward the data frame;

S503: If the relay information bit indicates that the relay needs to forward the data frame, send the data frame to an access point.

In an embodiment of the present invention, the method further includes: if the relay information bit indicates that the relay does not need to forward the data frame, discarding the data frame.

Figure 6:
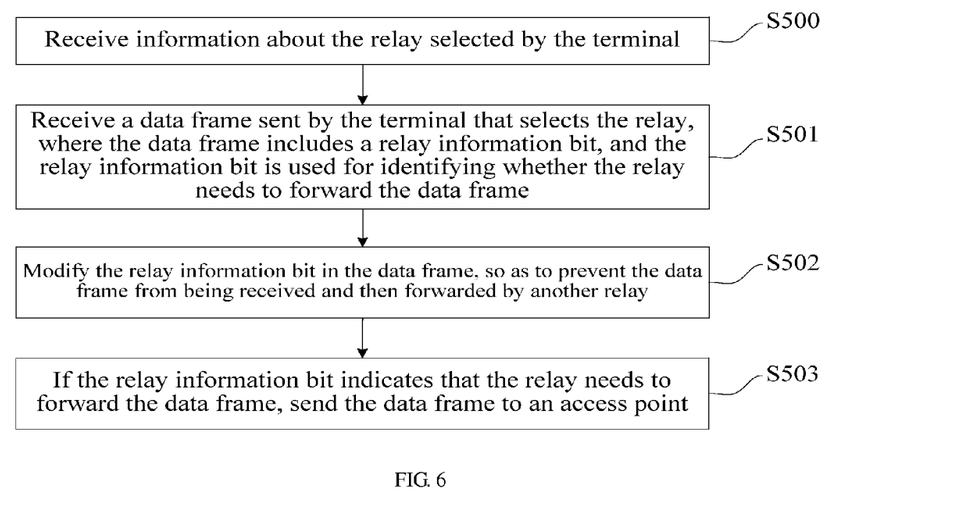
FIG. 6 is a flowchart of another embodiment of a data forwarding method of a relay according to the present invention.

In another embodiment of the present invention, FIG. 6 provides a flowchart of an embodiment of the present invention. Before the S501 of receiving a data frame sent by a terminal, the method further includes: S500: Receive information about the relay selected by the terminal; the receiving a data frame sent by a terminal includes: receive a data frame sent by the terminal that selects the relay.

The data frame further includes a relay address information bit, where the relay address information bit carries address information of the relay; the receiving a data frame sent by a terminal includes: receiving a data frame that includes the relay address information bit and is sent by the terminal; and if information about the relay address information bit is consistent with the address information of the relay, forwarding the data frame to the access point.

In an embodiment of the present invention, after the S501 of receiving a data frame sent by a terminal, and before the S503 of sending the data frame to an access point, the method further includes:

S502: Modify the relay information bit in the data frame, so as to prevent the data frame from being received and then forwarded by another relay.

For example, after receiving a frame for which Relay bit=1, a Relay station surrounding the terminal modifies Relay bit=0 (to prevent the frame from being forwarded again by another Relay station) after an SIFS duration, and then forwards the frame. The AP does not care for which Relay station forwards the data frame, and the Relay station is transparent relative to the AP. After receiving the frame, the AP directly sends, after the SIFS duration, acknowledgment information, such as ACK, to a station that requires a Relay.

In an embodiment of the present invention, after the receiving a data frame sent by a terminal, the sending the data frame to an access point includes sending the data frame to the access point after a duration of a short inter-frame space.

After the receiving a data frame sent by a terminal, and before the sending the data frame to the access point, the method includes: accessing a channel using a carrier sense multiple access with collision avoidance (CSMA/CA) channel access mechanism.

Figure 7:
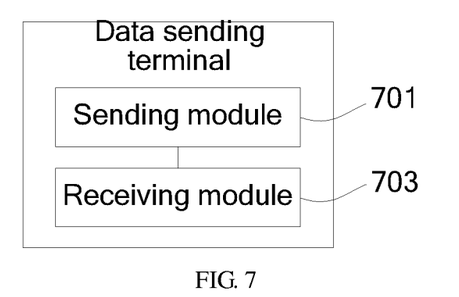
FIG. 7 is a structural diagram of an embodiment of a data sending terminal according to the present invention.

An embodiment of the present invention provides a data sending terminal. FIG. 7 is a structural diagram of an embodiment of a data sending terminal according to the present invention.

The terminal includes: a sending module 701 and a receiving module 703; the sending module 701 is configured to send a data frame to a relay, where the data frame includes a relay information bit, the relay information bit identifies whether the relay needs to forward the data frame, and if the relay information bit indicates that the relay needs to forward the data frame, the data frame is forwarded to an access point by the relay; and the receiving module 703 is configured to receive a response message of the access point, where the response message is used indicates that the data frame is correctly received by the access point.

If the relay information bit indicates that the relay does not need to forward the data frame, the data frame is discarded by the relay.

Figure 8:
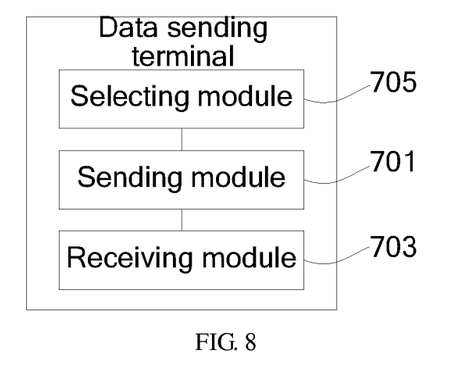
FIG. 8 is a structural diagram of an embodiment of a data sending terminal according to the present invention.

In another embodiment of the present invention, the terminal further includes a selecting module 705. FIG. 8 is a structural diagram of another embodiment of a data sending terminal according to the present invention. The selecting module 705 is configured to: before sending the data frame to the relay, select a relay with the best quality by interacting with the relay; the sending module is configured to send the data frame to the relay selected by the selecting module.

The data frame further includes a relay address information bit, where the relay address information bit carries address information of the selected relay; the sending module is configured to send a data frame that includes the relay address information bit to the relay selected by the selecting module, so that, if information about the relay address information bit is consistent with the address information of the selected relay, the data frame is forwarded to the access point by the selected relay.

The sending module 701 is configured to send the data frame to the relay by broadcasting.

The sending module 701 is further configured to: if the receiving module does not receive the response message of the access point within a first duration, resend the data frame to the relay, where the first duration is obtained according to twice a duration of a short inter-frame space, a timeslot duration, a sending duration of the data frame, and a delay duration of receiver starting.

The receiving module 703 is further configured to: after the sending module sends the data frame to the relay, receive the data frame forwarded by the relay; the sending module 701 is further configured to: if the data frame received by the receiving module is incorrect, resend the data frame to the relay.

Figure 9:
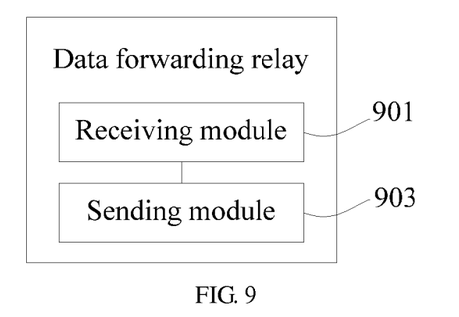
FIG. 9 is a structural diagram of an embodiment of a data forwarding relay according to the present invention.

An embodiment of the present invention provides a data forwarding relay. FIG. 9 is a structural diagram of an embodiment of a data forwarding relay according to the present invention. The relay includes: a receiving module 901 and a sending module 903, where the receiving module 901 is configured to receive a data frame sent by a terminal, where the data frame includes a relay information bit, and the relay information bit identifies whether the relay needs to forward the data frame; and the sending module 903 is configured to: if the relay information bit indicates that the relay needs to forward the data frame, send the data frame to an access point.

If the relay information bit indicates that the relay does not need to forward the data frame, the data frame is discarded.

The receiving module 901 is further configured to: before receiving the data frame sent by the terminal, receive information about the relay selected by the terminal, and receive a data frame sent by the terminal that selects the relay.

The data frame further includes a relay address information bit, where the relay address information bit carries address information of the relay; the receiving module 901 is configured to receive a data frame that includes the relay address information bit and is sent by the terminal; and if information about the relay address information bit is consistent with the address information of the relay, forward the data frame to the access point.

Figure 10:
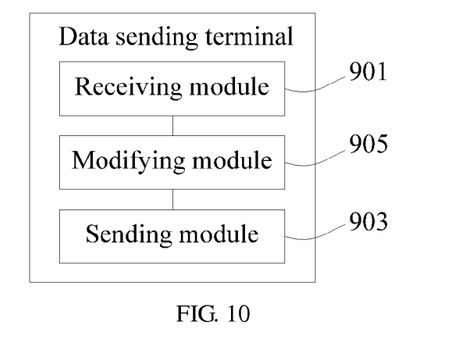
FIG. 10 is a structural diagram of another embodiment of a data forwarding relay according to the present invention.

An embodiment of the present invention provides another data forwarding relay. As shown in FIG. 10, FIG. 10 is a structural diagram of an embodiment of a data forwarding relay according to the present invention. The relay further includes a modifying module 905, where the modifying module is configured to modify the relay information bit in the data frame, so as to prevent the data frame from being received and then forwarded by another relay.

The sending module 903 is configured to: after a duration of a short inter-frame space since the receiving module receives the data frame sent by the terminal, send the data frame to the access point.

The sending module 903 is configured to: after the receiving module 901 receives the data frame sent by the terminal, access a channel using a CSMA/CA channel access mechanism.

An embodiment of the present invention provides a data sending system, where the system includes the terminal according to any one of the foregoing embodiments, and the relay according to any one of the foregoing embodiments.

A person skilled in the art may understand that the accompanying drawings are merely schematic diagrams of an exemplary embodiment, and modules or procedures in the accompanying drawings are not necessarily mandatory in implementing the present invention.

Persons skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data sending method of a terminal, comprising:
   sending a data frame to a relay, wherein the data frame comprises a relay information bit, wherein the relay information bit identifies whether the relay needs to forward the data frame, wherein the data frame is forwarded to an access point by the relay when the relay information bit indicates that the relay needs to forward the data frame, and wherein the relay discards the data frame when the relay information bit indicates that the relay does not need to forward the data frame; and
   receiving a response message of the access point, wherein the response message is used to indicate that the data frame is correctly received by the access point.

2. The method according to claim 1, wherein before sending the data frame to the relay, the method further comprises selecting the relay from a plurality of relays by interacting with the relays, wherein the selected relay has the best quality, and wherein sending the data frame to the relay comprises sending the data frame to the selected relay.

3. The method according to claim 2, wherein the data frame further comprises a relay address information bit, wherein the relay address information bit carries address information of the selected relay, and wherein sending the data frame to the selected relay comprises sending the data frame that comprises the relay address information bit to the selected relay so that, when information about the relay address information bit is consistent with the address information of the selected relay, the data frame is forwarded to the access point by the selected relay.

4. The method according to claim 1, wherein sending the data frame to the relay comprises sending the data frame to the relay by broadcasting.

5. The method according to claim 1, wherein after sending the data frame to the relay, the method further comprises resending the data frame to the relay when the response message of the access point is not received within a first duration, and wherein the first duration is obtained according to twice a duration of a short inter-frame space, a timeslot duration, a sending duration of the data frame, and a delay duration of receiver starting.

6. The method according to claim 1, wherein after sending the data frame to the day, the method further comprises:
   receiving the data frame forwarded by the relay; and
   resending the data frame to the relay when the data frame forwarded by the relay is incorrect.

7. A data forwarding method of a relay, comprising:
   receiving a data frame sent by a terminal, wherein the data frame comprises a relay information bit, and wherein the relay information bit identifies whether the relay needs to forward the data frame;
   modifying the relay information bit in the data frame to prevent the data frame from being received and then forwarded by another relay after receiving the data frame sent by the terminal; and
   sending the data frame to an access point when the relay information bit indicates that the relay needs to forward the data frame after modifying the relay information bit in the data frame to prevent the data frame from being received and then forwarded by the other relay.

8. The method according to claim 7, wherein the data frame is discarded when the relay information bit indicates that the relay does not need to forward the data frame.

9. The method according to claim 7, wherein before receiving the data frame sent by the terminal, the method further comprises receiving information about the relay selected by the terminal, and wherein receiving the data frame sent by the terminal comprises receiving the data frame sent by the terminal that selects the relay.

10. The method according to claim 9, wherein the data frame further comprises a relay address information bit, wherein the relay address information bit carries address information of the relay, wherein receiving the data frame sent by the terminal comprises receiving the data frame that comprises the relay address information bit and is sent by the terminal so that, when information about the relay address information bit is consistent with the address information of the relay, the data frame is forwarded to the access point.

11. The method according to claim 7, wherein after the receiving the data frame sent by the terminal, sending the data frame to an access point comprises sending the data frame to the access point after a duration of a short inter-frame space.

12. The method according to claim 7, wherein after receiving the data frame sent by the terminal and before sending the data frame to the access point, the method further comprises accessing a channel using a carrier sense multiple access with collision avoidance (CSMA/CA) channel access mechanism.

13. A data sending terminal, wherein the terminal comprises:
   a processor;
   a transmitter coupled to the processor and configured to send a data frame to a relay, wherein the data frame comprises a relay information bit, wherein the relay information bit identifies whether the relay needs to forward the data frame, and wherein the data frame is forwarded to an access point by the relay when the relay information bit indicates that the relay needs to forward the data frame; and a receiver coupled to the processor and configured to:
  receive a response message from the access point, wherein the response message indicates whether the data frame is correctly received by the access points; and
  receive the data frame forwarded by the relay after the transmitter sends the data frame to the relay,
wherein the transmitter is further configured to resend the data frame to the relay when the data frame received by the receiver is incorrect.

14. The terminal according to claim 13, wherein the data frame is discarded by the relay when the relay information bit indicates that the relay does not need to forward the data frame.

15. The terminal according to claim 13, wherein the processor is configured to select the relay with the best quality from a plurality of relays by interacting with the relay before sending the data frame to the relay, and wherein the transmitter is configured to send the data frame to the relay selected by the processor.

16. The terminal according to claim 15, wherein the data frame further comprises a relay address information bit, wherein the relay address information bit carries address information of the selected relay, and wherein the transmitter is configured to send the data frame that comprises the relay address information bit to the relay selected by the processor so that, when information about the relay address information bit is consistent with the address information of the selected relay, the data frame is forwarded to the access point by the selected relay.

17. The terminal according to claim 13, wherein the transmitter is configured to send the data frame to the relay by broadcasting.

18. The terminal according to claim 13, wherein the transmitter is further configured to resend the data frame to the relay when the receiver does not receive the response message of the access point within a first duration, and wherein the first duration is obtained according to twice a duration of a short inter-frame space, a timeslot duration, a sending duration of the data frame, and a delay duration of receiver starting.

19. A data forwarding relay, wherein the relay comprises:
a processor;
a receiver coupled to the processor and configured to receive a data frame sent by a terminal, wherein the data frame comprises a relay information bit and a relay address information bit, wherein the relay information bit identifies whether the relay needs to forward the data frame, and wherein the data frame is forwarded to an access point when information about the relay address information bit is consistent with the address information of the relay; and
a transmitter coupled to the processor configured to send the data frame to an access point when the relay information bit indicates that the relay needs to forward the data frame.

20. The relay according to claim 19, wherein the data frame is discarded when the relay information bit indicates that the relay does not need to forward the data frame.

21. The relay according to claim 19, wherein the receiver is further configured to:
  receive information about the relay selected by the terminal before receiving the data frame sent by the terminal; and
  receive the data frame sent by the terminal that selects the relay.

22. The relay according to claim 19, wherein the processor is configured to modify the relay information bit in the data frame so as to prevent the data frame from being received and then forwarded by another relay.

23. The relay according to claim 19, wherein the transmitter is further configured to send the data frame to the access point after a duration of a short inter-frame space since the receiver receives the data frame sent by the terminal.

24. The relay according to claim 19, wherein the transmitter is configured to access a channel using a carrier sense multiple access with collision avoidance (CSMA/CA) channel access mechanism after the receiver receives the data frame sent by the terminal.

* * * * *

UNITED STATES PATENT AND TRADEMARK OFFICE
CERTIFICATE OF CORRECTION

PATENT NO. : 9,510,267 B2  
APPLICATION NO. : 14/553490  
DATED : November 29, 2016  
INVENTOR(S) : Ziquan Zhou, Xun Yang and Lvxi Yang It is certified that error appears in the above-identified patent and that said Letters Patent is hereby corrected as shown below:

Page 2, References Cited, Other Publications Section should read:

Foreign Communication From A Counterpart Application, Chinese Application No. 201210166763.4, Chinese Office Action dated July 7, 2016, 7 pages.

Signed and Sealed this  
Fourteenth Day of February, 2017

Michelle K. Lee  
*Director of the United States Patent and Trademark Office*